United States Patent

Grant

[15] 3,689,954
[45] Sept. 12, 1972

[54] AUTOMOBILE WASHING UNIT

[72] Inventor: Howard E. Grant, c/o Trans-World Car Wash Systems, Inc., 65 Marine St., Farmingdale, N.Y. 11735

[22] Filed: July 31, 1969

[21] Appl. No.: 846,481

[52] U.S. Cl. ................................. 15/21 E, 15/DIG. 2
[51] Int. Cl. ........................................... B60s 3/06
[58] Field of Search .......... 15/DIG. 2, 21 D, 21 E, 53, 15/97

[56] References Cited

UNITED STATES PATENTS

| 3,238,551 | 3/1966 | Cirino et al. | 15/21 E |
| 3,428,983 | 3/1969 | Seakan | 15/21 E |
| 3,540,069 | 11/1970 | Grant | 15/21 D |
| 3,546,728 | 12/1970 | Hanna | 15/21 D |
| 3,559,225 | 2/1971 | Gougoulas | 15/21 E |
| 3,588,935 | 6/1971 | Anttila | 15/21 E |

OTHER PUBLICATIONS

Auto Laundry News; April, 1968; page 2

*Primary Examiner*—Edward L. Roberts
*Attorney*—Friedman & Goodman

[57] ABSTRACT

For use in a car or automobile washing unit in the operation of which the washing unit surrounds the automobile and moves along a prescribed path, thereby associating the automobile with various apparatus contained on the washing unit for cleaning different parts of the automobile, a side window washer including at least one brush centrifugally mounted on a pivotable overhead support which yieldably extends into the automobile during its path of movement so that the brush, during a cleaning interval, makes cleaning contact with the automobile and, more particularly, as the washer moves past the automobile, the angular orientation of the brush is such that the brush has a wiping stroke diagonally across the automobile side window so that the successive portions of the window coming into contact with the brush are in complete contacting relation therewith, and a front, side panel, fender and rear body washer including at least one brush rotatingly held in a support frame pivotally mounted on an overhead support which is itself pivotable in dual cross-direction so that the brush is continuously moving in a plane vertical to the automobile and has a wiping stroke adjustable to the shape and dimensions of the automobile.

8 Claims, 11 Drawing Figures

INVENTOR.
HOWARD E. GRANT
BY Friedman & Goodman
Attorneys

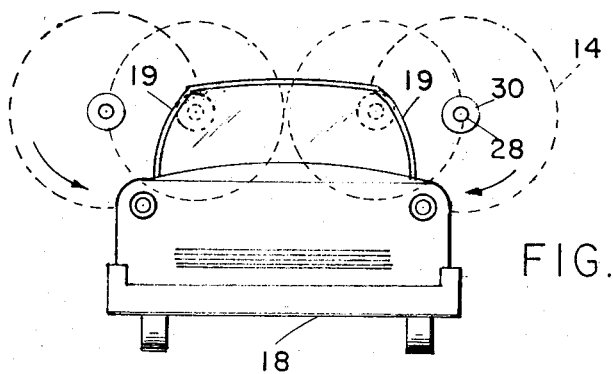
FIG. 4.
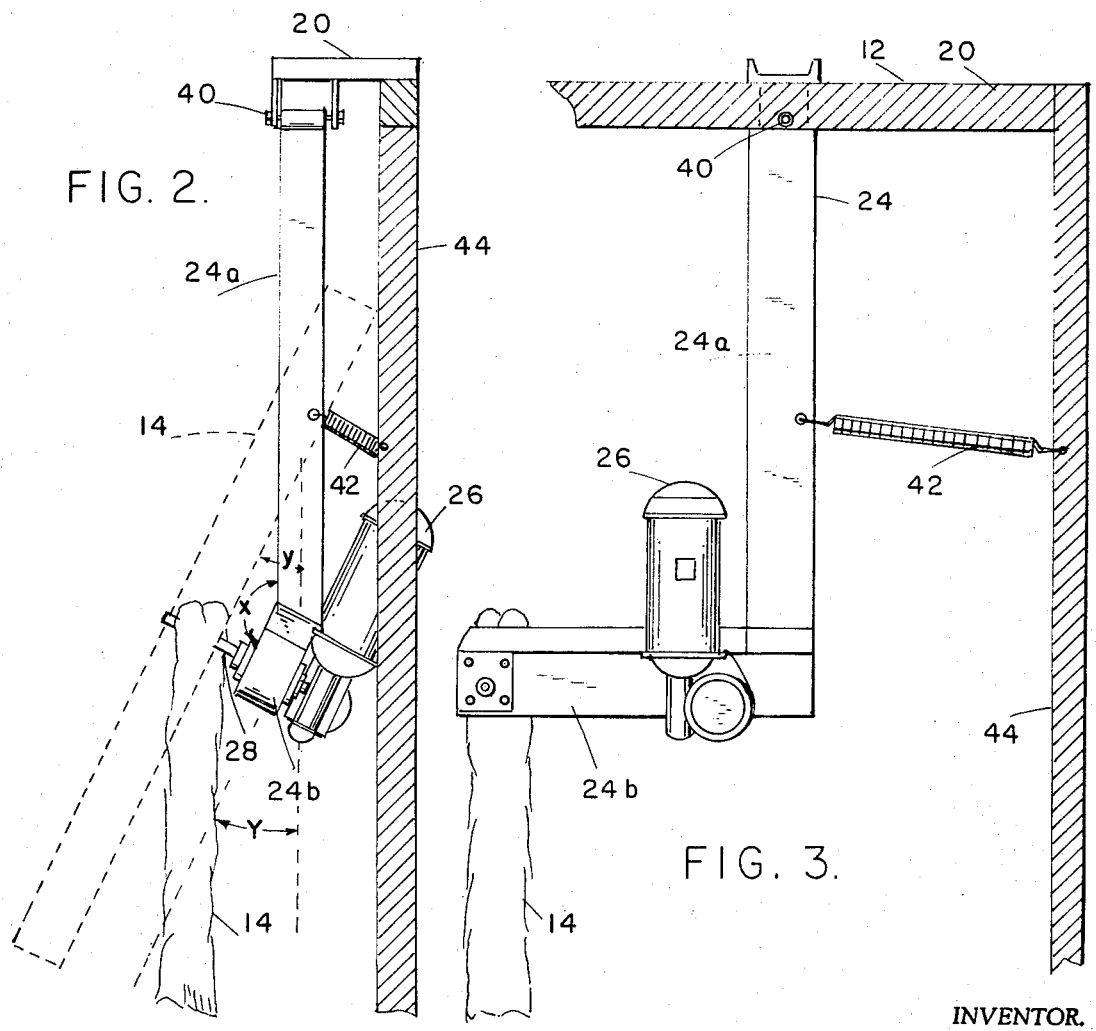
FIG. 2.
FIG. 3.
INVENTOR.
HOWARD E. GRANT
BY Friedman & Goodman
Attorneys

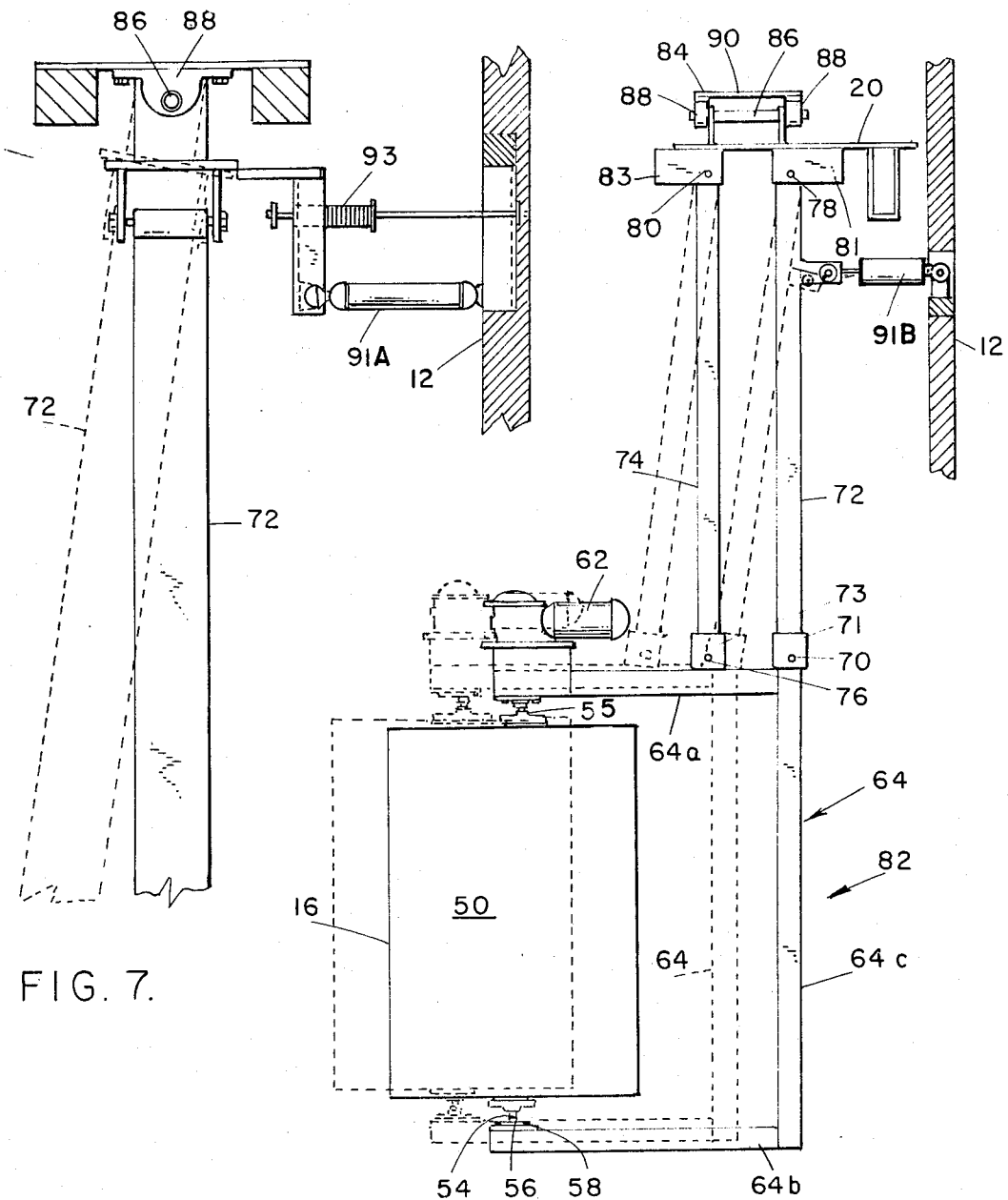

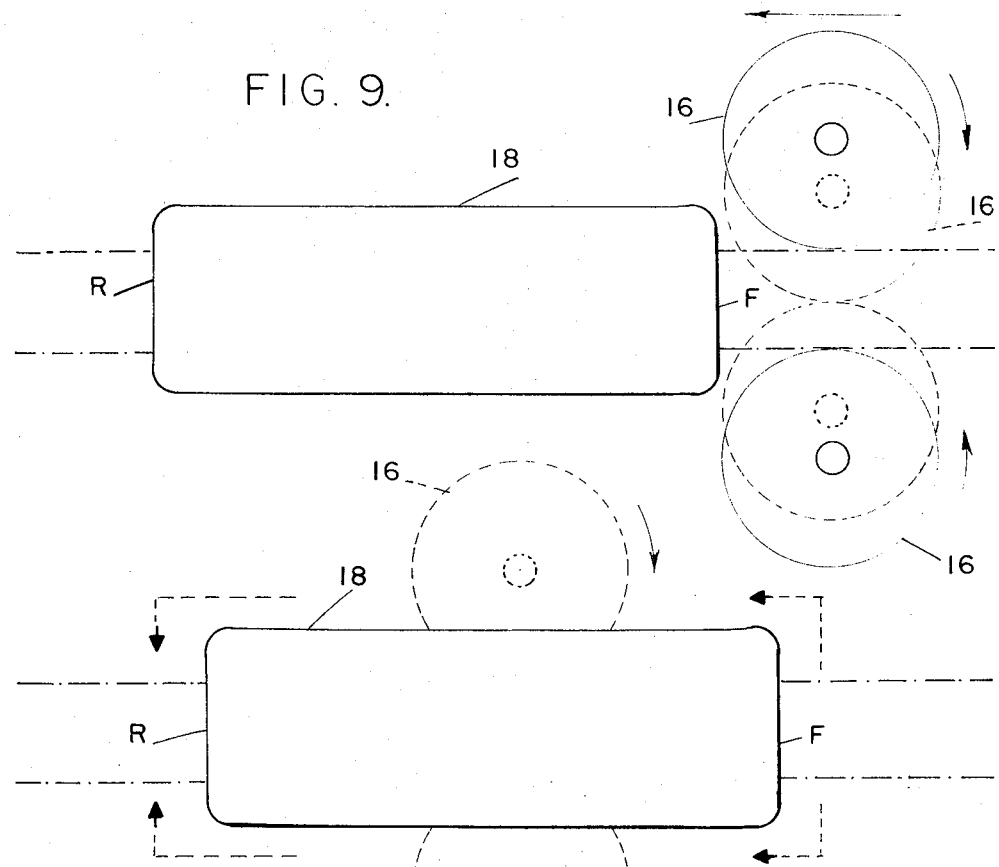
FIG. 9.
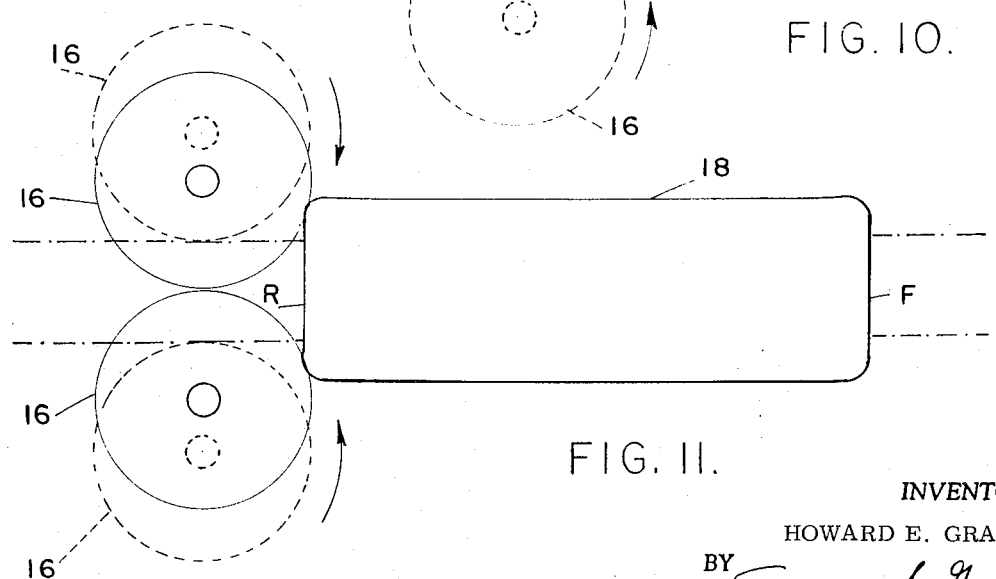
FIG. 10.
FIG. 11.
INVENTOR.
HOWARD E. GRANT
BY Friedman & Goodman
Attorneys

AUTOMOBILE WASHING UNIT

BACKGROUND OF THE INVENTION

1. Field of the Invention:

The present invention relates generally to automobile washing units in the operation of which use is made of various apparatus intended for cleaning different parts of the automobile, and more particularly, to an improved automobile side window washer and front, side panel, fender and rear body washer.

2. Description of the Prior Art:

In current use are numerous embodiments of automobile washing units which have in common a mode of operation wherein the automobile is urged along a path of movement in association with different apparatus strategically located and designed to clean a different part of the automobile. Alternatively, the washing unit is set into a movable frame, usually on tracks, and the automobile remains stationary inside the washing unit while the latter moves thereover. Consistent with the popularity and proven commercial acceptance of these units, there is a continuing effort by equipment manufacturers to provide improved car cleaning apparatus, particularly that designed to clean the automobile side windows which are only partially cleaned by prior art brushes in that only the central portions of the windows are contacted by the brush and not their peripheral areas. Another problem has been to provide a brush which will completely clean the front, side panels, fenders and rear of the automobile regardless of its shape and dimensions. For example, if the design of the automobile is characterized by having a number of pronounced indentations, such as in the front of the car, the prior art brushes are not adapted to compensate for these indentations and as a result the body is not completely washed at that portion.

SUMMARY OF THE INVENTION

It is therefore among the principal objectives of the invention to provide an improved automobile side window washer and body washer overcoming the foregoing and other short comings of the prior art. In accord with the invention there is provided, for use in a car or automobile washing unit in the operation of which the washing unit surrounds the automobile and moves along a prescribed path, thereby associating the automobile with various apparatus contained on the washing unit for cleaning different parts of the automobile, in combination a side window washer and a front, side panel, fender and rear body washer.

The side window washer includes at least one brush centrifugably mounted on a pivotal overhead support which yieldably extends into the automobile during its path of movement so that the brush, during a cleaning interval, makes cleaning contact with the automobile and, more particularly, as the washing unit moves past the automobile, the angular orientation of the brush is such that the brush has a wiping stroke diagonally across the automobile side window so that the successive portions of the window coming into contact with the brush are in complete contacting relation therewith.

The body brush includes at least one brush rotatingly held in a support frame pivotally mounted on an overhead support, which is itself pivotable in dual crossdirection by virtue of its dual pivotal arrangement with the washing unit frame, and which brush initially extends directly in front of the automobile during its path of movement so that the brush, during its cleaning interval, makes cleaning contact with the automobile and, more particularly, as the washing unit moves past the automobile, the pivotal arrangement of the brush and overhead support is such that the brush is continuously moving in a plane vertical to the automobile and has a wiping stroke adjustable to the shape and dimensions of the automobile.

BRIEF DESCRIPTION OF THE DRAWING

The invention will be hereinafter more fully described with reference to the accompanying drawings in which:

FIG. 2 is fragmented partially sectional side view showing the side window washing brush of the invention.

FIG. 3 is a fragmented partially sectional end view showing the side window washer of FIG. 2.

FIG. 4 is a front end elevational view illustrating by dotted lines the centrifugal washing action of the side window washer shown by FIGS. 2 and 3.

FIG. 6 is a fragmented partially sectional front end elevational view of the body brush shown by FIG. 5.

FIG. 7 is a fragmented partially sectional side elevational view of the mounting support for the body brush shown by FIGS. 5 and 6.

FIGS. 9, 10 and 11 are diagrammatic top plan views sequentially showing the movement and washing action of the body brushing during the path of movement of the washing unit along the body of the automobile.

DESCRIPTION OF THE SPECIFIC EMBODIMENTS

Figure 1:
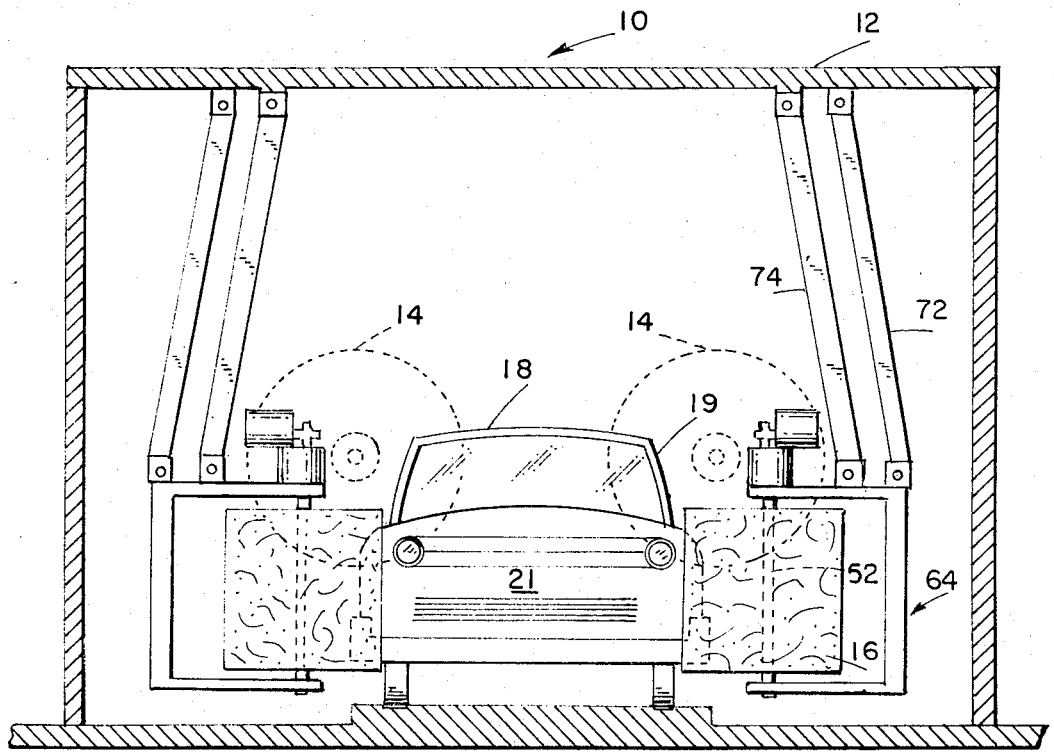
FIG. 1 is a front end elevational view showing an automobile situated in a washable position inside a washing unit adapted in accord with the invention and illustrating the relative positions of the inventive side window brushes and body brushes.

Referring now to the figures in detail, and particularly to FIGS. 1 to 4, there is illustrated an automobile washing unit 10 having a frame 12 to which is mounted via suitable supports to be described, a pair of opposing side window brushes 14 and a pair of opposing body brushes 16 for washing the front, side panels, fenders and rear of an automobile 18. The washing unit is of a conventional design, wherein the automobile to be washed remains stationary, while the auto washing unit surrounds the automobile and passes thereover, thereby associating the automobile with the various apparatus contained on the washing unit for cleaning different parts of the automobile. Usually, this type of unit is rideable on tracks and during its operation, an automobile is driven into the washing unit to a point where an "electric eye" type of signaling device is provided, and whose actuation, thereby automatically starts the washing and moving operation of the washing unit.

Describing first the side window washers 14, there is provided connected to the horizontal cross member 20 of frame 12, a pivotally mounted L-shaped brush support 24 which, at approximately the juncture of its legs 24a and 24b, has an appropriate bracket for mounting a motor 26 which is operatively arranged to centrifugally drive the brushes 14. Specifically, the brush support leg 24b will be understood to be a hollow housing having appropriately entrained, on supporting sprockets therein, an endless driving chain operatively connected to the motor 26 at its input end, and at the output end connected to the support shaft 28 of the brush 14. As generally understood, rotation of the shaft 28 produces corresponding rotation of the body of the brush 14, diagrammatically illustrated in the drawings, but fabricated of numerous lengths of stringy yarn such as is conventionally used, for example, in mops, which are connected radially to, and dangle from, the brush mount 30. Thus, when the shaft 28 rotates the brush mount 30, the dangling lengths of stringy yarn will be propelled outwardly by centrifugal force, thereby achieving the "propeller-type" cleaning motion of the brush as illustrated by dotted lines in FIGS. 1 and 4. The opposing brushes are rotated so that one operates in a clock-wise direction and the other in a counter-clock-wise direction.

According to a critical feature of the invention, the brush support legs 24a and 24b are joined so that they subtend an obtuse angle X of preferably 155°. By virtue of this orientation, the brush mounted to support leg 24b is itself disposed at an acute angle Y of 25° with respect to the vertical plane of the support leg 24a. It has been found that by this particular angular orientation that the brush achieves a wiping stroke diagonally across the automobile side window 19, such that successive portions of the window coming into contact with the centrifugally whirling brush are in complete contacting relation therewith. In other words, in contrast to the prior art, the entire window at the point contacted by the brush is washed, i.e., the central, as well as peripheral portions of the window.

As earlier mentioned, the overhead support 24 is mounted to horizontal member 20 by means of a pivot 40 which will allow for movement of the brush support back and forth depending on the width of the automobile being washed. This brush support is adapted to be self-adjusting by means of a tension spring 42 connected between vertical frame member 44 of the washing frame 12 and the brush support leg 24a. Thus, when the frame 12 with its attendant automobile cleaning parts move over the automobile, the brush will extend into the automobile during the path of movement of the frame and depending on the width of the automobile the pivotally mounted support will be displaced outwardly in the direction of the arrow O, and when the washing operation has been finished and the automobile driven out, the tension spring 42, by virtue of its self-adjusting nature, will bring the brush support 24 back to its originally, normally, oriented position.

Figure 8:
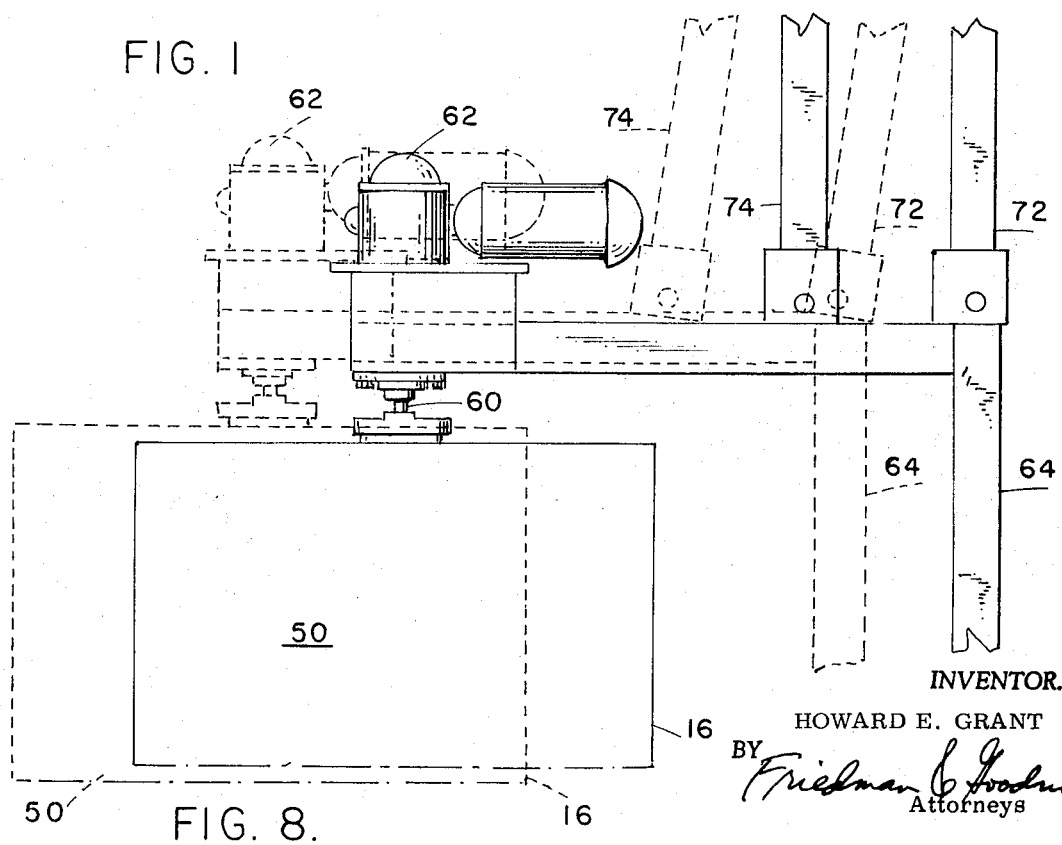
FIG. 8 is a fragmented detailed view of the body brush shown by FIG. 6 and illustrating the relative pivotal movement of the body brush and its support by dotted lines.
Figure 5:
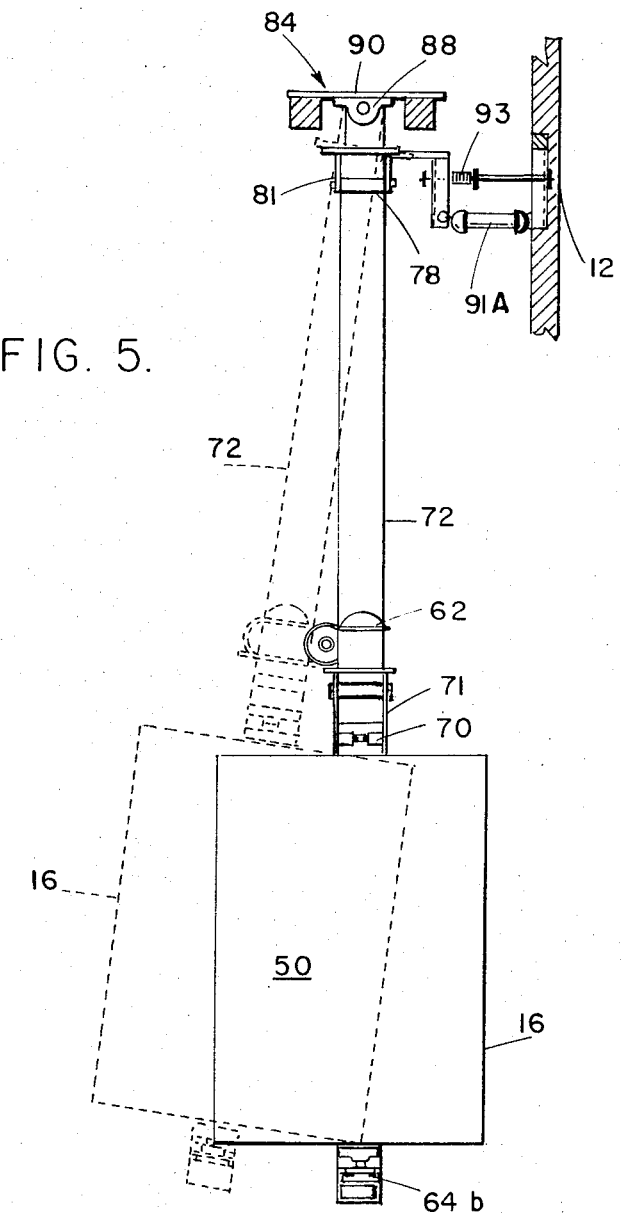
FIG. 5 is a fragmented partially sectional side elevational view of the body brush of the invention.

Referring now to FIGS. 1 and 5 through 8, inclusive, there is shown a rotary car body washing brush 16 which is designed specifically to clean the car front, side panel, fenders and rear of the car body. As mentioned earlier, the car wash unit 10 is of the type that moves over the car while the latter is in a stationary position. Thus, the brush 16, in its starting cleaning position, is located in a position operative to make cleaning contact with one-half of the front of the car; whereas, the subsequent cleaning position of the brush 16 is one in which it is both in advantageous position in orientation to make cleaning contact with the fenders, side panel and one-half of the rear of the car, as will be described further in detail subsequently.

The rotary brush 16 will be understood to be generally of conventional construction and made of usual materials which provide a cleaning body 50 appropriately mounted on a central, longitudinal shaft 52, the lower extending end 54 of which is conventionally accommodated in a bearing 56 affixed to a pivotal support 58. The upper shaft end 55 is connected to a drive shaft of a motor 62 which is operatively effective to power the brush 16 in rotation.

Serving as a mounting for the brush is a C-shaped support generally designated 64 formed by an upper leg 64a, a lower leg 64b and an intermediate interconnecting leg 64c, the brush 16 being appropriately journaled for rotation in the front opening of the support 64, between the upper and lower legs 64a and 64b. The motor 62 is advantageously supported on the upper leg 64a with its drive shaft depending therefrom through an appropriate opening in the upper leg 64a into a position adjacent the upper shaft end 55. The connection between motor drive shaft and rotarizable brush 16 is conventional and need not be further described here, the invention lying elsewhere, as will be readily apparent.

The C-shaped support 64 is in turn pivotally connected by means of a pivot 70 through connecting member 71 at the juncture of the upper leg 64a and connecting leg 64c, to an overhead support bar 72. Similarly, another support bar 74 parallel to support bar 72 is also pivotally connected to the C-shaped support 64 at a position intermediate said support bar 72 and motor 62 and connected to support leg 64a by means of a pivot 76 through connecting member 73. In turn, the support bars 72 and 74 are pivotally connected to the overhead, horizontal cross member 20 by means of pivot pins 78 and 80 respectively, in suitable pivot housings 81 and 83, respectively. Further, in turn, the entire body brush assembly 82 is connected to pivotal means 84 consisting of a pivot pin 86 journaled for rotation in a pair of opposing end plates 88 joined by a connecting plate 90. A conventional hydraulic cylinder 91A acting in association with a return spring 93 supplies the moving power lengthwise of the car 18, for the pivotal means 84 and thereby the bars 72 and 74. Pivotal means 84 are self-adjusting as will be seen by the dimensions of the car being washed. Similarly, a conventional hydraulic cylinder 91B (FIG. 6) supplies moving power directly to bars 72 and 74 widthwise or transversely of the car 18. Thus, looking at FIGS. 5 and 6 specifically, the pivotal actions of the overhead support bars 72 and 74 are operable at right angles to the pivotal action of the entire assembly 82. In other words, the body wash brush is pivotal in dual cross direction by means of the aforesaid pivotal arrangements just described, the power cylinders 91A and 91B being controlled by conventional means.

As earlier described, C-shaped support 64 is pivotally mounted to overhead support bars 72 and 74.

This is so that the brush during its movement along the body of the car will always be movable in a plane vertical to the horizontal plane of the automobile during the washing operation. Thus the brush 16 will always be operating in a washing position parallel to the vertical plane of the car. Now, by virtue of the aforementioned dual pivotal direction, the dimensions and characterizing design features of the car can be compensated for, as follows: As an example, looking at FIG. 5 when the brush 16 is in the vertical starting cleaning position (shown by solid lines), it is in the front 21 of the car. By virtue of the self-adjustable nature of the pivot means 84 the brush is in a position to compensate for the length of the car, as well as its particular design features, by being pivotally movable either in a direction towards the car or outwardly from the car. In other words, if the front of the car has a pronounced indentation, in contour the pivotal manner by which the brush 16 is supported for movement in dual cross-direction will compensate for this by moving the brush into the contoured indentation thereby cleaning that particular spot completely. Thus, conversely, if the front of the car is provided with a projection, similarly the pivotal action of the brush will compensate for the projection by allowing the brush to be displaced forwardly of the car. The width wise dimensions of the car are compensated for by the hydraulically operated pivotal action of the supporting bars 72 and 74. This is shown by the relative dotted line positions of FIGS. 6 and 8.

Referring now to FIGS. 9 through 11, the cleaning action of the body brushes is diagrammatically shown. They operate in a counter direction, one clock-wise and the other counter-clock-wise. The frame of the auto washing unit (not shown) is moving in the direction of the arrows, from front to back, along the front sides and rear of the stationary automobile 18. As shown in the initial starting position, the rotarizing brushes 16 (shown by dotted lines) are in a position in the front F of the automobile. As the brushes continue to rotarize, they are horizontally movable along the front end of the auto until they come to the end of the front portion, then the brushes turn at a substantially right angle as shown by dotted lines and proceed to wash the fenders and side panels of the car until they come to the rear R of the automobile when another substantially right angle turn is made and the rear end of the auto is washed. This is another feature of the invention, and this is that the combined action of the pivotal arrangements of the C-shaped support, the overhead support bars and the brush body assembly provides for this right angle brush cleaning direction at the corners of the automobile. Thus wasted motion is avoided and the brushes are continuously in contact with the surface of the automobile body.

In accord with the invention, therefore, there has been just described an improved automobile washing unit which provides for complete cleaning action with respect to the parts intended to be washed thereby; the side window brushes completely wash the side windows and the body brushes completely wash the front, side panels, fenders and rear of the automobile body.

What is claimed is:

1. For use in an automobile washing unit of the type having means for encompassing the automobile while moving along a prescribed path of movement thereby associating said automobile with cleaning apparatus contained in said washing unit, in combination, a side window washer and a front, side panel, fender and rear body washer, said side window washer comprising a dangling brush pivotally mounted on a pivotal overhead support therefor and operatively arranged for being imparted centrifugal force to yieldably extend into contact with said automobile during the path of movement of said washing unit so that said brush during a cleaning interval makes cleaning contact with said automobile side window, said brush being angularly oriented with respect to said overhead support whereby said brush executes a wiping stroke diagonally across said automobile side window so that the successive portions of window coming into contact with said brush are in substantially co-extensive cleaning contact therewith over the entire area of said portions, said body washer comprising a brush rotatingly held in a support frame therefor, said support frame being pivotally mounted on an overhead support which is itself adapted to be pivotal in dual cross-direction with the result that said brush is continuously contactingly moving in a plane vertical to said automobile and has a wiping stroke adjustable to the shape and dimensions of said automobile, said side window washer and body brush being commonly supported on said means which encompasses the automobile for being commonly carried together lengthwise of the latter and acting in mutual operative association to substantially completely clean the respective automobile parts contacted thereby.

2. In an automobile washing unit of the type having means for encompassing the automobile while moving along a prescribed path of movement thereby associating said automobile with cleaning apparatus contained in said washing unit, a side window washer comprising a dangling brush pivotally mounted on a pivotal overhead support, drive means for drivingly imparting to said dangling brush centrifugal force to cause the brush to yieldably extend into contact with said automobile during the path of movement of said washing unit so that said brush during a cleaning interval makes cleaning contact with said automobile side window, said brush being angularly oriented with respect to said overhead support whereby said brush executes a wiping stroke diagonally across said automobile side window so that the successive portions of the window coming into contact with said brush are in substantially co-extensive cleaning contact therewith over the entire area of said portions.

3. The device according to claim 1 wherein said pivotal overhead support comprises an L-shaped body having a vertical leg and a horizontal leg, drive means for centrifugally operating said brush provided on said horizontal leg, said brush being mounted to said horizontal leg, said overhead support being pivotally mounted to a horizontal cross member of said frame, the brush support legs being joined so that they subtend an obtuse angle, said brush being resultingly mounted to said horizontal leg at a corresponding acute angle defined with respect to the vertical plane of said vertical support leg, said drive means centrifugally driving said brush so as to execute a diagonal wiping stroke whose angle is defined by said acute angle.

4. The device according to claim 3 wherein said obtuse angle is about 155° and said acute angle is about 25°.

5. An automobile washing unit according to claim 2 wherein said pivotal overhead support comprises an L-shaped body having a vertical leg and a horizontal leg, said brush being mounted to said horizontal leg, said overhead support being pivotally mounted to a horizontal cross member of said frame, the brush support legs being joined so that they subtend an obtuse angle, said brush being resultingly mounted to said horizontal leg at a corresponding acute angle defined with respect to the vertical plane of said vertical support leg, said drive means centrifugally driving said brush so as to execute a diagonal wiping stroke whose angle is defined by said acute angle.

6. The device according to claim 5 wherein said obtuse angle is about 155° and said acute angle is about 25°.

7. The device according to claim 1 wherein said brush support frame comprises a substantially planar C-shaped support formed by an upper leg, a lower leg and a medial connecting leg operatively oriented with the opening between said upper and lower legs facing said automobile during the path of movement of said washing unit, said brush being journaled for rotation in said opening between said support upper and lower legs, said C-shaped support being mounted to a pair of overhead support bars, said support bars being mounted to the frame of said washing unit, first pivotal means joining said C-shaped support to said overhead support bars, second pivotal means joining said overhead support bars to said frame, third pivotal means also joining said overhead support bars to said frame, said first and second pivotal means being in axial alignment, said third pivotal means pivoting said body washer in a direction counter to the direction of said first and second pivotal means, said first pivotal means adapting said body brush to move in said vertical plane, said second pivotal means adjusting said body washer to the width-wise dimensions of said automobile and said third pivotal means adjusting said body washer to the length-wise dimensions of said automobile and to its characterizing shape.

8. The device according to claim 2 wherein said brush and overhead support are adapted to yieldably extend into contact with said automobile by means of tensionable springing means attached between said overhead support and said washing unit which in turn act to return the side window washer to its starting position.

* * * * *